US008917499B1

(12) United States Patent
    Read

(10) Patent No.: US 8,917,499 B1
(45) Date of Patent: Dec. 23, 2014

(54) FOLDABLE KEYBOARD

(71) Applicant: ZAGG Intellectual Property Holding Co., Salt Lake City, UT (US)

(72) Inventor: John Robert Read, Salt Lake City, UT (US)

(73) Assignee: ZAGG Intellecutal Property Holding Co., Salt Lake City, UT (US)

( * ) Notice: Subject to any disclaimer, the term of this patent is extended or adjusted under 35 U.S.C. 154(b) by 0 days.

(21) Appl. No.: 14/330,948

(22) Filed: Jul. 14, 2014

(51) Int. Cl.
    *G06F 1/16* (2006.01)
(52) U.S. Cl.
    CPC .................. *G06F 1/1666* (2013.01)
    USPC ............ 361/679.15; 361/679.13; 361/679.16; 400/682
(58) Field of Classification Search
    CPC .............. G06F 3/0221; G06F 1/1666
    USPC .......................... 361/679.15, 69.16
    See application file for complete search history.

(56) References Cited

U.S. PATENT DOCUMENTS

| | | | |
|---|---|---|---|
| 5,457,453 A | 10/1995 | Chiu et al. | |
| 6,144,551 A * | 11/2000 | Kao | 361/679.15 |
| 6,370,018 B1 * | 4/2002 | Miller et al. | 361/679.08 |
| D457,525 S * | 5/2002 | Olodort et al. | D14/396 |
| 6,457,996 B1 * | 10/2002 | Shih | 439/638 |
| 6,498,720 B2 * | 12/2002 | Glad | 361/679.11 |
| 6,614,649 B1 * | 9/2003 | Wang | 361/679.11 |
| 6,700,775 B1 * | 3/2004 | Chuang et al. | 361/679.01 |
| 6,768,635 B2 * | 7/2004 | Lai et al. | 361/679.11 |
| 6,774,888 B1 * | 8/2004 | Genduso | 345/168 |
| 6,898,073 B2 * | 5/2005 | Lin | 361/679.08 |
| 6,920,039 B2 | 7/2005 | Mochizuki et al. | |
| 7,085,129 B2 * | 8/2006 | Hsu | 361/679.08 |
| 7,123,242 B1 * | 10/2006 | Henty | 345/169 |
| 7,393,151 B1 * | 7/2008 | Miller, Jr. | 400/682 |
| 7,477,508 B1 * | 1/2009 | Pilkington et al. | 361/679.09 |
| 7,612,989 B2 * | 11/2009 | Northway | 361/679.16 |
| 8,570,726 B2 | 10/2013 | Wu et al. | |
| 2002/0033761 A1 * | 3/2002 | Katakami et al. | 341/22 |
| 2003/0017746 A1 * | 1/2003 | Lee | 439/638 |
| 2003/0048595 A1 * | 3/2003 | Hsieh et al. | 361/680 |
| 2004/0004809 A1 * | 1/2004 | Mochizuki et al. | 361/680 |
| 2004/0033096 A1 * | 2/2004 | Choi et al. | 400/472 |
| 2004/0136149 A1 * | 7/2004 | Wang et al. | 361/680 |
| 2005/0146446 A1 * | 7/2005 | Hsu | 341/22 |
| 2006/0071820 A1 * | 4/2006 | Wang et al. | 341/22 |
| 2006/0152894 A1 * | 7/2006 | Moengen | 361/681 |

(Continued)

OTHER PUBLICATIONS

Folding Keyboard, by Yoonsang Kim & Eunsung Park; http://www.yankodesign.com/2009/12/11/folding-fan-is a keyboard/ accessed Dec. 11, 2009; pp. 3.

*Primary Examiner* — Anthony Q Edwards
(74) *Attorney, Agent, or Firm* — Thorpe North & Western LLP

(57) ABSTRACT

A foldable keyboard comprises a pair of keyboard panels with a proximal panel pivotal over a distal panel about a keyboard hinge oriented laterally with respect to and located between two adjacent rows of keys of the keyboard. A stand panel is pivotally coupled to the distal panel at a stand hinge oriented laterally with respect to the keyboard, and pivotal over the proximal panel of the keyboard. A kickstand can be pivotally coupled to a back of the stand panel. A shelf can be pivotally coupled to a front of the stand panel at a shelf hinge located proximate to the stand hinge to receive the tablet computer thereon.

21 Claims, 6 Drawing Sheets

(56) References Cited

U.S. PATENT DOCUMENTS

| | | | |
|---|---|---|---|
| 2006/0214916 A1* | 9/2006 | Mulford | 345/169 |
| 2007/0008291 A1* | 1/2007 | Liu | 345/168 |
| 2008/0273012 A1* | 11/2008 | Bullister | 345/169 |
| 2009/0086424 A1* | 4/2009 | Jette | 361/679.55 |
| 2010/0141588 A1* | 6/2010 | Kimura et al. | 345/169 |
| 2010/0157518 A1* | 6/2010 | Ladouceur et al. | 361/679.09 |
| 2012/0009000 A1* | 1/2012 | Starrett | 400/472 |
| 2012/0170198 A1* | 7/2012 | Wu et al. | 361/679.15 |
| 2013/0229773 A1* | 9/2013 | Siddiqui et al. | 361/679.59 |
| 2013/0242492 A1 | 9/2013 | Griffin et al, | |
| 2014/0055920 A1* | 2/2014 | Liang | 361/679.01 |

* cited by examiner

FOLDABLE KEYBOARD

BACKGROUND

1. Field of the Invention

The present invention relates generally to a foldable keyboard for tablet computers, cellular or cell phones (or smart phones) and phablets, and the like.

2. Related Art

Tablet computers or tablets, such as the Apple® iPad® tablet computer, have grown in popularity. Such tablet computers are often thin, rectilinear computers with a broad touch screen that can offer media viewing and user input through a graphical keyboard. In addition, cellular or cell phones, or so called smart phones, have also grown in popularity, and have increased their abilities and computing power to blur the distinction between tablets and smart phones. So called phablets have combined the functions of smart phones and tablets.

These tablets, smart phones, and phablets have also increased their abilities and computing power to rival portable computers or laptop computers. One distinction between the laptop computers and tablets, is that tablets lack a keyboard external to their display. Typing or keyed entry on the tablet computers, and smart phones and phablets, can be difficult due to the lack of haptic or tactile response of the graphical keyboard, and the large amount of space required by the graphical keyboard leaves a small viewing area. User's can supplement the tablet computer with a wireless keyboard to facilitate typing or keyed entry. Such wireless keyboards can also be incorporated into the case or folio. As tablets grow smaller and more portable, it is difficult to provide an external keyboard.

SUMMARY OF THE INVENTION

It has been recognized that it would be advantageous to develop an external or supplemental, tactile keyboard for use with a tablet, smart phone or phablet that is foldable to a smaller width or size and capable of being folded and insertable into a user's pocket, purse, briefcase, glovebox, etc. when not in use. In addition, it has been recognized that it would be advantageous to develop an external or supplemental, tactile keyboard that can carry or support a tablet, smart phone or phablet during use, but still be foldable.

The invention provides a foldable keyboard to selectively carry and operatively couple to a tablet computer. A pair of keyboard panels is pivotally coupled together by a keyboard hinge, and has a proximal panel and a distal panel. Both of the pair of keyboard panels has a plurality of keys defining an alphanumeric keyboard with the keys arranged in rows. The pair of keyboard panels has an unfolded use configuration with the pair of keyboard panels oriented substantially parallel and substantially co-planar. The keyboard hinge is oriented laterally with respect to the keyboard, and located and extends between two adjacent rows of keys of the keyboard. The proximal panel is foldable over the distal panel with the keys thereof opposing one another in a folded storage configuration. A stand panel is pivotally coupled to the distal panel at a stand hinge. The stand hinge is oriented laterally with respect to the keyboard. The stand panel is pivotal over the proximal panel of the keyboard in the folded storage configuration. A kickstand is pivotally coupled to a back of the stand panel. A shelf is pivotally coupled to a front of the stand panel at a shelf hinge located proximate to the stand hinge. The shelf is pivotal between: 1) a retracted position against the stand panel, corresponding to the folded storage configuration; and 2) an extended position with a distal end of the shelf disposed away from the stand panel, corresponding to the unfolded use configuration and configured to receive the tablet computer thereon.

In addition, the invention provides a tri-panel and bi-fold foldable keyboard having: 1) a folded storage configuration, and 2) an unfolded use configuration to selectively carry and operatively couple to a tablet computer. A pair of keyboard panels is pivotally coupled together by a keyboard hinge, and has a proximal panel with a free proximal edge, and a distal keyboard panel with a distal edge opposite the free proximal edge. Both of the pair of keyboard panels has a plurality of keys defining an alphanumeric keyboard with the keys arranged in rows, and the keyboard hinge disposed between two adjacent rows. The pair of keyboard panels fold between: 1) the unfolded use configuration with the pair of keyboard panels oriented substantially parallel and substantially co-planar, and with the keys of each of the pair of keyboard panels facing outwardly and exposed for use, and 2) the folded storage configuration in which the pair of keyboard panels are oriented substantially parallel and facing one another, and with the keys of each of the pair of keyboard panels facing towards one another. A stand panel is pivotally coupled to the distal edge of the distal keyboard panel at a stand hinge. The stand panel is foldable between: 1) the unfolded use configuration in which the stand panel forms an obtuse angle with respect to the pair of keyboard panels configured to receive the tablet computer, and 2) the folded storage configuration in which the stand panel is folded over the proximal keyboard panel with the proximal keyboard panel between the stand panel and the distal keyboard panel.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Figure 1:
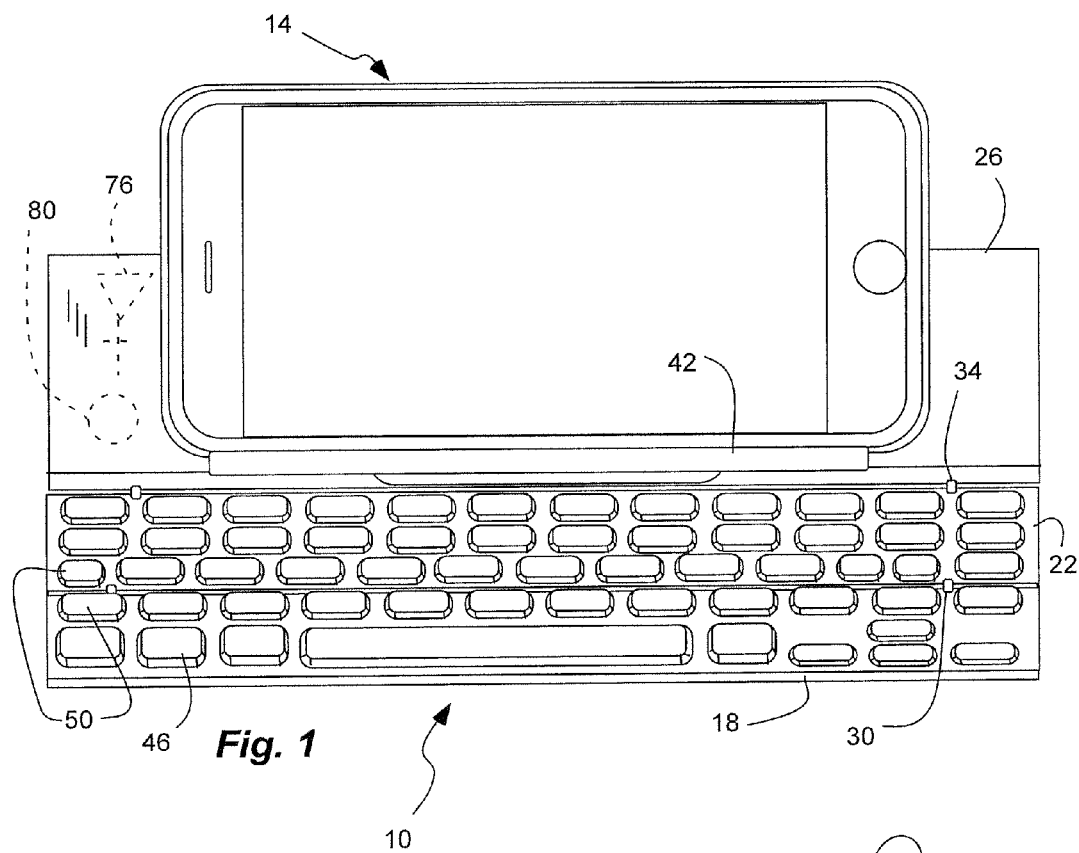
FIG. 1 is a front view of a foldable keyboard device in accordance with an embodiment of the present invention shown carrying a tablet thereon in a landscape orientation, and shown in an unfolded use configuration.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

Definitions

The terms "tablet computer" and "tablet" are used interchangeably herein to refer to a computer or multi-media device that is one-piece with a screen and that is portable and handheld. Examples of tablets include the Apple™ iPad™, the Samsung™ Galaxy™ Tab™, etc. The screen can be a touch screen that can receive input by touch, such as finger swipes, and/or can have a virtual keyboard. The tablet can be wide (or broad) and thin. For example, the screen can have a diagonal length greater than 7 inches, and a thickness less than a ¼-½ inch. The tablet can have a battery and memory and a processor with software running thereon. The tablet can have WiFi and Bluetooth connectivity. Thus, the tablet can provide internet browsing, game playing, movie and picture display, e-book display, etc. In addition, the tablet can include a digital camera. Furthermore, the terms tablet computer and tablet are used broadly herein to refer to cellular or cell phones (or smart phones) and phablets, which also provide similar computing capabilities, battery power, memory, processor, software, WiFi and Bluetooth connectivity, touch screen display, digital camera, etc. Such phones or phablets can have a screen with a diagonal length less than 7 inches and a thickness less than 10 mm. Examples of cell phones and phablets include the Apple iPhone, the Samsung Galaxy S phone series, the Samsung Note 3 phablet, HTC One Max, Nokia Lumina 1520, etc.

In addition, such tablet computers can have a rectangular shape with a longer height and a narrower width (in a portrait orientation), and with a landscape orientation commonly utilized with keyboards in which the width is vertical and the height is horizontal. Furthermore, such tablets can have different widths between brands and/or models.

The term "keyboard" refers to an array or matrix of alpha-numeric (both alphabetical and/or numeric) or character keys, modifier keys for altering the functions of other keys, navigation keys for moving the text cursor on a display, function keys and/or system command keys. The keyboard can have a keyboard layout with keys arranged in an acceptable format or standard, such as the QWERTY layout. The keyboard layout can include three rows of characters or letters, a row of numbers above the characters, and one or two rows of other keys, such as a space bar, modifier keys, function keys, navigations keys, etc., for a total of five or six rows. Most of the keys can be square or rectilinear buttons of the same size and shape. In addition, the keys can be buttons capable of registering contact, pressure or force from a user's fingers. The keys or buttons can use any appropriate switch technology, including for example, membrane, dome-switch, scissor-switch, capacitive, mechanical-switch, buckle spring, Hall effect, laser, optical, etc. The keys, buttons and/or switches can provide a feedback response and can have a travel distance.

Description

Figure 2:
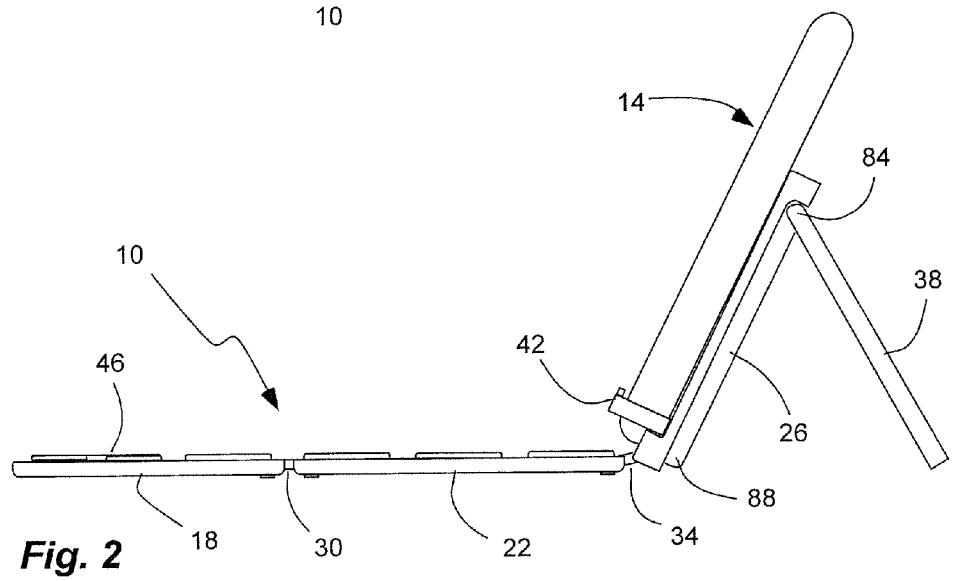
FIG. 2 is a side view of the foldable keyboard device of FIG. 1, also shown carrying the tablet thereon in the landscape orientation, and show in the unfolded use configuration.
Figure 3:
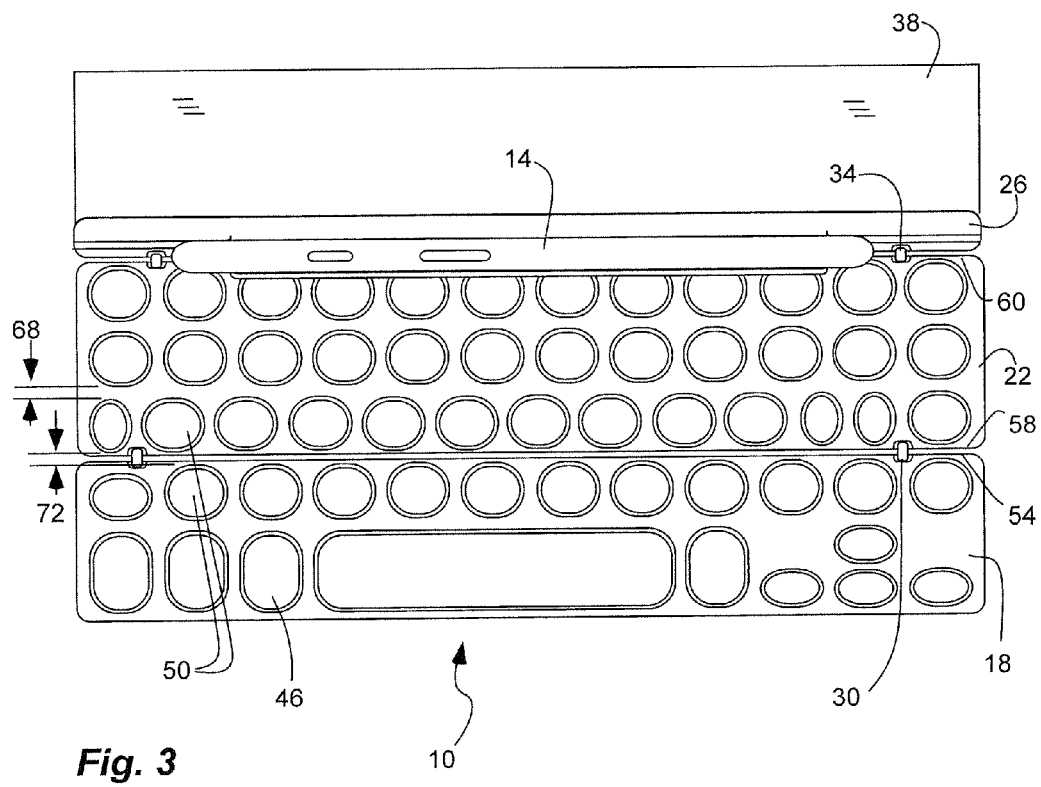
FIG. 3 is a top view of the foldable keyboard device of FIG. 1, also shown carrying the tablet thereon in the landscape orientation, and show in the unfolded use configuration.
Figure 4:
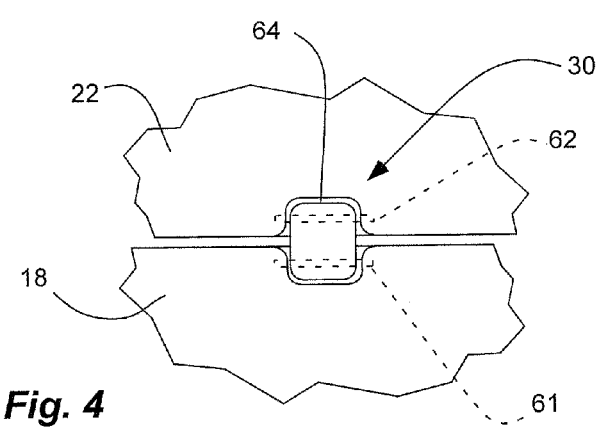
FIG. 4 is a partial, detailed view of a double axis keyboard hinge of the foldable keyboard device of FIG. 1.
Figure 5:
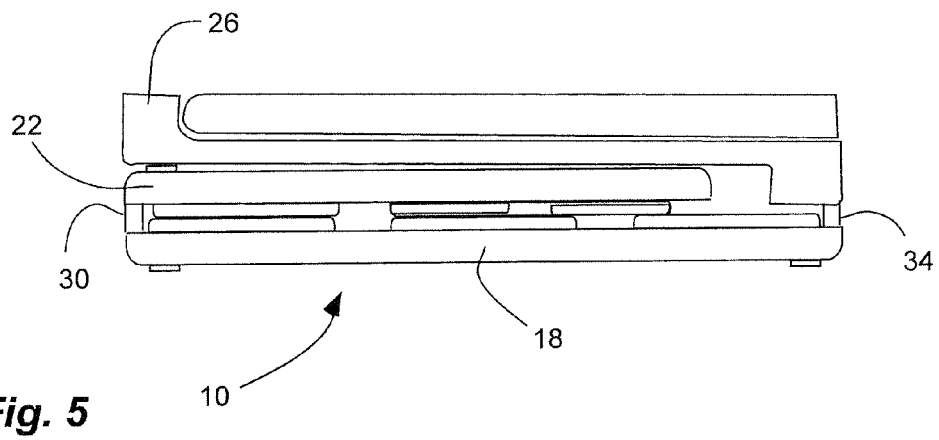
FIG. 5 is a side view of the foldable keyboard device of FIG. 1, shown with the tablet removed therefrom, and show in the folded storage configuration.
Figure 6:
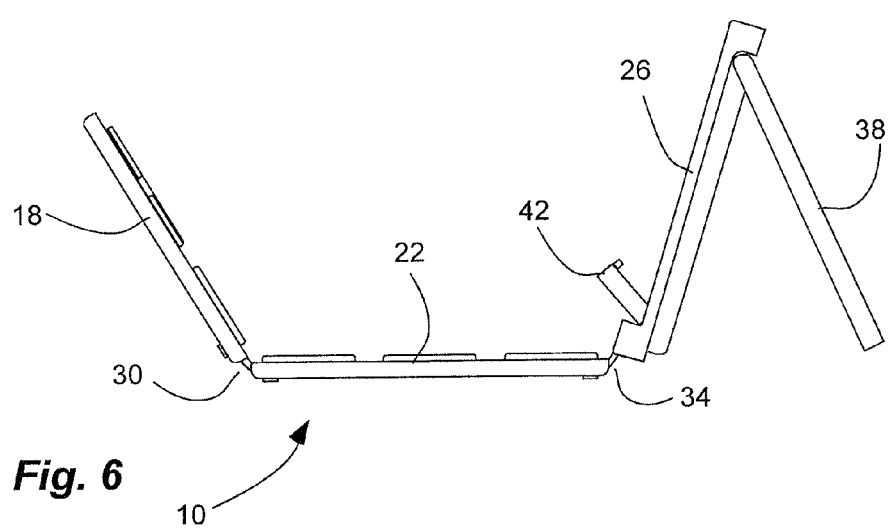
FIG. 6 is a side view of the foldable keyboard device of FIG. 1, shown transitioning between the unfolded use configuration and the folded storage configuration.
Figure 7:
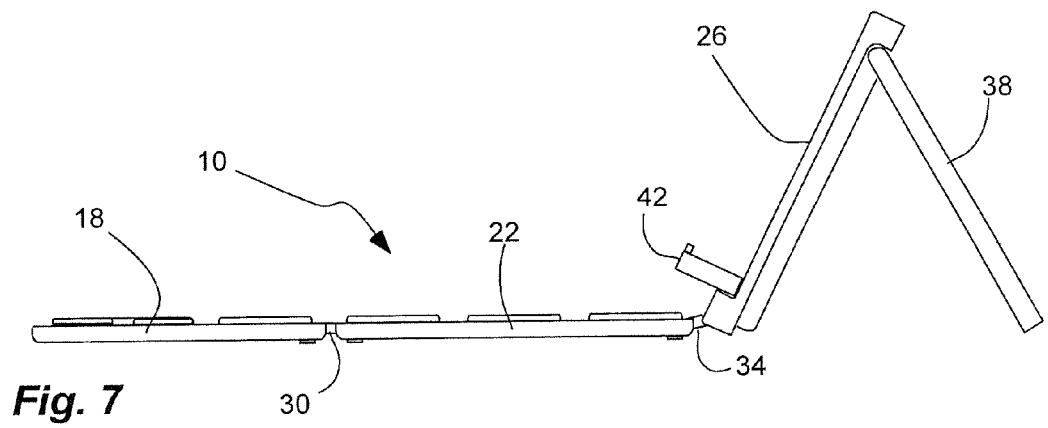
FIG. 7 is a side view of the foldable keyboard device of FIG. 1, shown with the tablet removed therefrom, and show in the unfolded use configuration.
Figure 8:
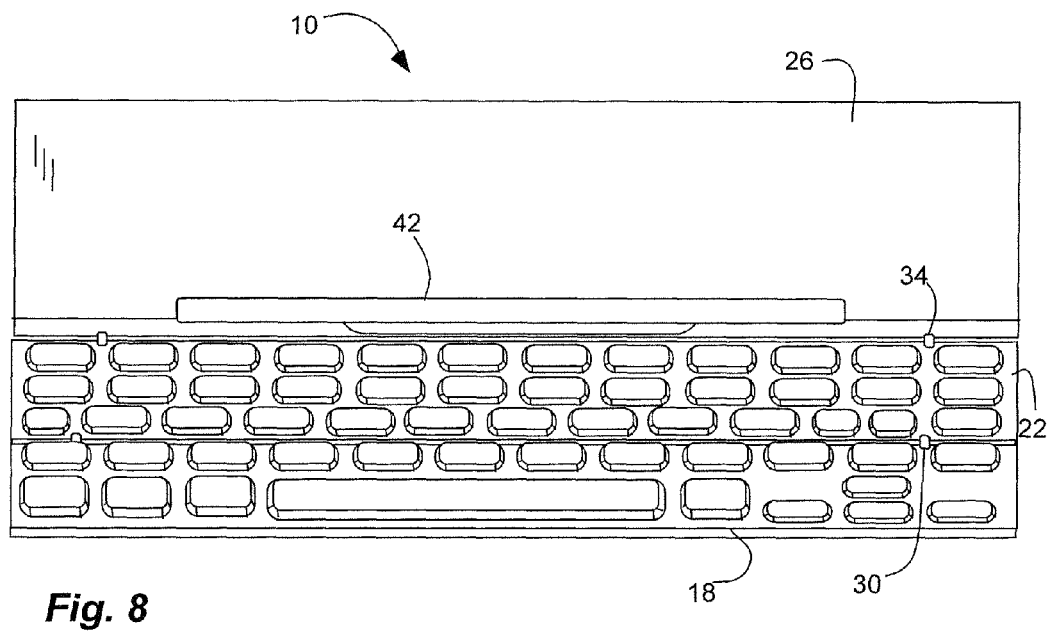
FIG. 8 is a front view of the foldable keyboard device of FIG. 1, shown with the tablet removed therefrom, and show in the unfolded use configuration.
Figure 9:
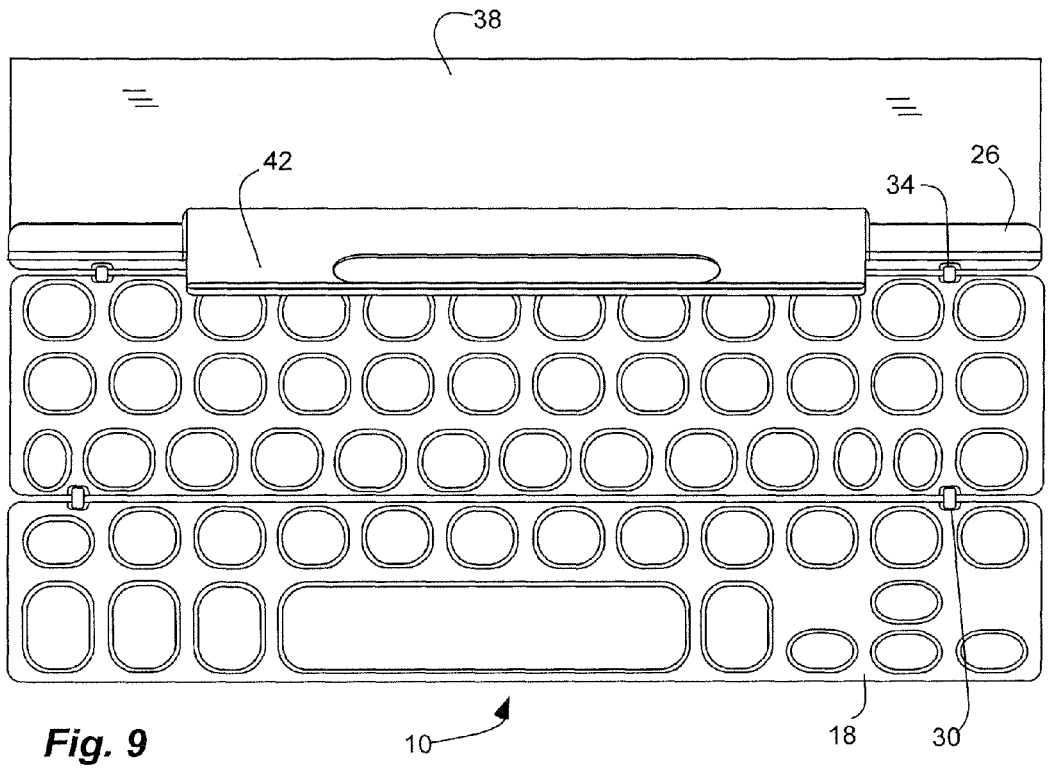
FIG. 9 is a top view of the foldable keyboard device of FIG. 1, shown with the tablet removed therefrom, and show in the unfolded use configuration.
Figure 10:
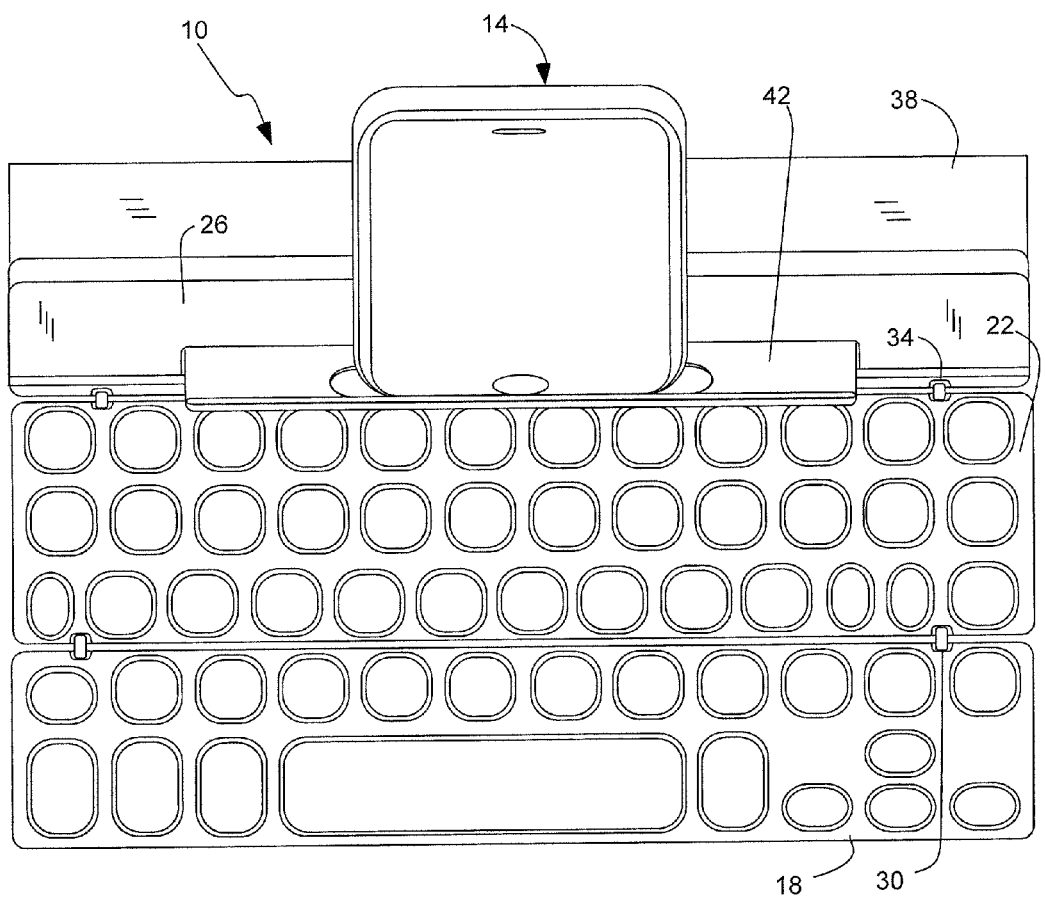
FIG. 10 is a top view of the foldable keyboard device of FIG. 1, also shown carrying the tablet thereon in a portrait orientation, and show in the unfolded use configuration.
Figure 11:
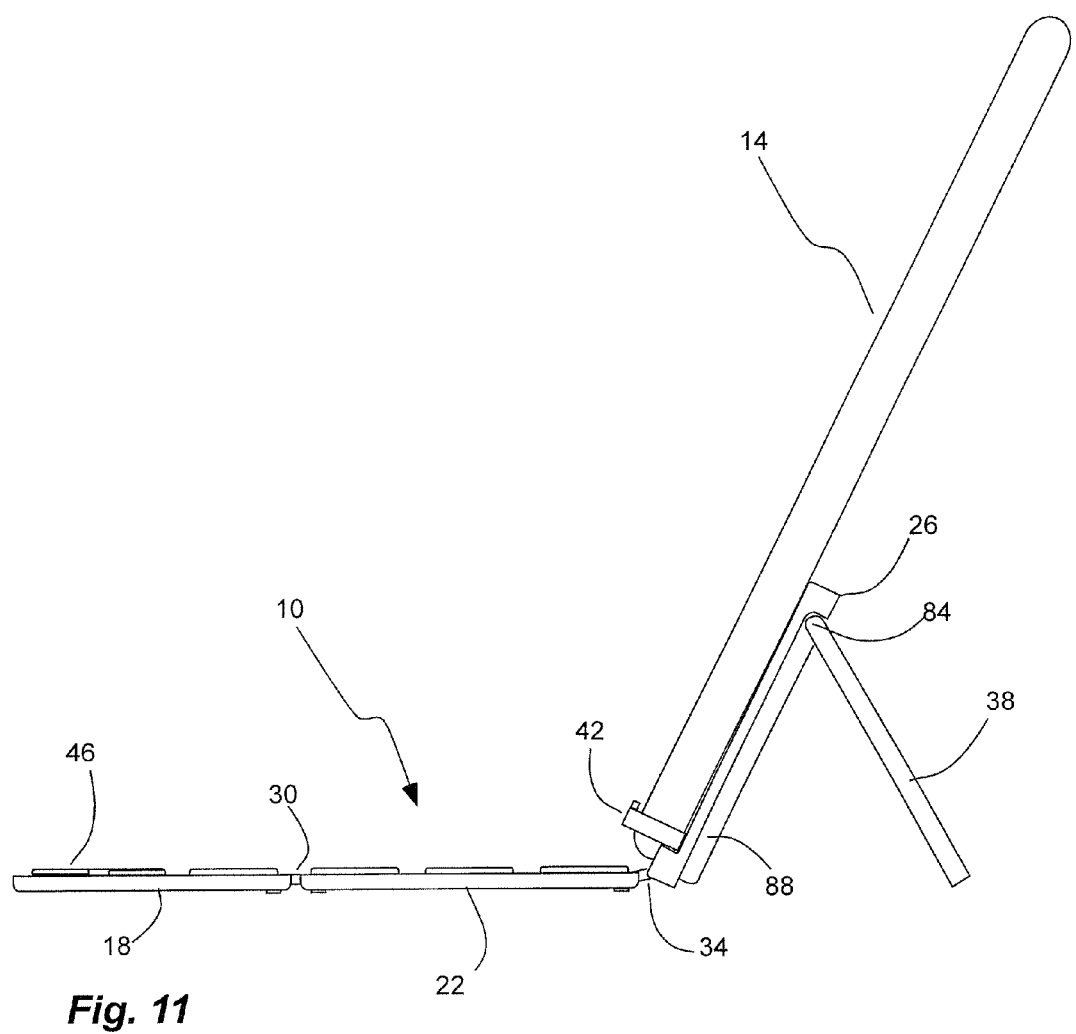
FIG. 11 is a side view of the foldable keyboard device of FIG. 1, also shown carrying the tablet thereon in a portrait orientation, and show in the unfolded use configuration.

As illustrated in FIGS. 1-11, a foldable keyboard device, indicated generally at 10, in an example implementation in accordance with the invention is shown to selectively receive, support, carry and operatively couple to a tablet, smart phone or phablet, indicated generally at 14. The foldable keyboard 10 can be foldable to a smaller size to be easily transported and stored, such as in a user's pocket. In addition, the foldable keyboard can fold along a natural, linear partition between adjacent rows of keys. Although the keyboard folds between the keys, the keyboard can include a hinge configured to maintain the same gap between the rows with the hinge, as the rows without the hinge. Furthermore, the foldable keyboard can also include a foldable stand that can fold along with the keyboard, and that can carry the tablet, smart phone or phablet. Thus, the foldable keyboard can be a tri-panel and bi-fold keyboard with three panels (two keyboard panels 18 and 22 and a stand panel 26), and two hinges (a keyboard hinge 30 and a stand hinge 34). The stand 26 can include a kickstand 38 to support the stand and tablet when open. In addition, the stand can include a foldable shelf 42 to receive the tablet when in use.

The foldable keyboard 10 comprises a pair of keyboard panels 18 and 22, and a stand panel 26, with a proximal keyboard panel 18 foldable over a distal keyboard panel 22, and the stand panel 26 foldable over the proximal keyboard panel and the distal keyboard panel (with the proximal keyboard panel between the distal keyboard panel and the stand panel), defining a folded storage configuration. The pair of keyboard panels is pivotally coupled together by a keyboard hinge 30. The proximal and distal panels have a plurality of keys 46 defining an alphanumeric keyboard with the keys arranged in rows. The keys can be movably disposed, with a vertical travel, on a surface of the panels. The pair of keyboard panels has an unfolded use configuration with the pair of keyboard panels oriented substantially parallel and substantially co-planar. The keyboard hinge 30 is oriented laterally with respect to the keyboard, and is located and extends between two adjacent rows 50 of keys of the keyboard. The keys of the panels oppose one another when the proximal panel is folded over the distal panel in the folded storage configuration. The stand panel is pivotally coupled to the distal panel at a stand hinge 34 oriented laterally with respect to the keyboard.

As described above, the tri-panel and bi-fold foldable keyboard 10 can have: 1) a folded storage configuration; and 2) an unfolded use configuration to selectively carry and operatively couple to a tablet computer 14. In the folded storage configuration, the keyboard 10 can have a reduced length (oriented fore and aft with respect to the keyboard) so that the folded keyboard can be inserted into a pocket of clothing or backpack or the like. Also in the folded storage configuration, the panels 18, 22 and 26 can be parallel and folded atop one another in a stack, as opposed to being coplanar. In the folded storage configuration, the pair of keyboard panels face one another, and the keys of each of the pair of keyboard panels face towards one another. In the unfolded use configuration, the keyboard, and namely the keyboard panels 18 and 22, can be disposed on a support surface, such as a table or desk or the like. The keyboard panels 18 and 22 can rest flat on the support surface, and can be parallel and coplanar with respect to one another. The keys of each of the pair of keyboard panels face outwardly and are exposed for use in the unfolded use configuration. In addition, the stand panel 26 can be oriented at an obtuse angle with respect to the keyboard, such as at an angle of 115 in one aspect (or between 110 to 120 degrees in another aspect, or between 100 to 130 degrees in another aspect).

The proximal keyboard panel 18 can have a free proximal edge proximate the user during use, and a distal edge 54. The distal keyboard panel 22 can have a proximal edge 58 proximal the distal edge 54 of the proximal panel, and an opposite distal edge 60, opposite the proximal edge 58 of the distal panel, and opposite the free proximal edge of the proximal panel. Both of the pair of keyboard panels 18 and 22 has a plurality of keys 46 defining an alphanumeric keyboard with the keys arranged in rows.

The pair of keyboard panels 18 and 22 is pivotally coupled together by a keyboard hinge 30. The keyboard hinge 30 is disposed between two adjacent rows 50 of keys. The keyboard hinge 30 is oriented laterally (side to side) with respect to the keyboard, and located between and extending between two adjacent rows 50 of keys of the keyboard. Thus, the keyboard can fold along a natural, linear partition between adjacent rows of keys. In addition, the keyboard hinge bifurcates the keyboard. In one aspect, the keyboard hinge 30 comprises a double axle keyboard hinge, or a link hinge. The hinge or link can have a proximal keyboard hinge 61 and a distal keyboard hinge 62 interconnected by a link 64. The link 64 has a proximal end pivotally coupled to the proximal panel 18 by the proximal keyboard hinge 61, and a distal end pivotally coupled to the distal panel 22 by the distal keyboard hinge 62. The link 64 and the pair of spaced-apart hinges allows in the proximal panel to fold over the distal panel, and be parallel therewith. In addition, the link and the pair of spaced-apart hinges allows a spacing 68 between adjacent rows without a hinge to be substantially the same as a spacing between the two adjacent rows with the double axle keyboard hinge. The link 64 can be flush with a panel surface of the pair of keyboard panels. In addition, the keyboard hinge and/or links is located below a top surface of the keys in the unfolded use configuration. Thus, the link does not interfere with operation of the keyboard. In one aspect, the hinge can comprise a plurality of separate and discrete hinges arrayed along a width (oriented in a lateral direction with respect to the keyboard) of the pair of keyboard panels. For example, the hinge can comprise a pair of hinges, as shown. In another aspect, all of the plurality of hinges can be located interior with respect to exterior lateral sides of the pair of keyboard panels, or inside a lateral perimeter of the keyboard panels. Outermost hinges can be separated from the exterior lateral sides of the pair of keyboard panels by at least one key. Thus, the location of the hinges resists external interference or pinching.

The stand panel 26 is pivotally coupled to the opposite edge or distal edge 60 of the distal keyboard panel 22 at the stand hinge 42. The stand panel 26 is foldable between i) the unfolded use configuration, and the folded storage configuration. In the unfolded use configuration, the stand panel 26 forms an obtuse angle with respect to the pair of keyboard panels to receive and orient the tablet computer. In the folded storage configuration, the stand panel is folded over the proximal keyboard panel 18, with the proximal keyboard panel between the stand panel and the distal keyboard panel.

In one aspect, the stand panel 26 can contain or carry a power source 76, such as a battery or a rechargeable battery, and communication means 80 for communicating with the tablet computer. The stand panel can include an electrical socket to connect the battery to a charger. By way of example, the communication means can comprise a transceiver to send and receive radio signals or other electromagnetic signals between the keyboard and the tablet. The communications means can utilize a communication protocol, such as Bluetooth. As another example, the communications means can comprise an electromechanical connection to make a physical and electrical link between the keyboard and the tablet. The panels (keyboard panels and stand panel) can be operatively interconnected, or electrically interconnected, such as by electric ribbon connectors. In another aspect, one or both of the keyboard panels can carry the power source and/or the communication means.

The stand panel 26 can have a depth (oriented in a fore and aft direction with respect to the keyboard) that is substantially the same as a depth (oriented in the fore and aft direction with respect to the keyboard) of the distal keyboard panel. Thus, in the folded storage configuration, the depth of the stand panel and the distal panel are the same to sandwich the proximal panel therebetween. The pair of keyboard 18 and 22 and stand 26 panels, in the folded storage configuration, can have a combined thickness less than 15 mm in one aspect. In addition, the pair of keyboard 18 and 22 and stand 26 panels, in the folded storage configuration, can have a depth (oriented in a fore and aft direction with respect to the keyboard) less than 60 mm, in one aspect. Thus, the keyboard can be folded for storage. In addition, the keyboard maintains its width, while reducing its depth (longitudinally or fore and aft with respect to the keyboard.

The kickstand 38 is pivotally coupled to a back of the stand panel 26 at a kickstand hinge or pivot 84. In one aspect, the kickstand hinge 84 can be located intermediate the stand hinge 42 and a free distal edge of the stand panel. In another aspect, the kickstand hinge can be located adjacent, proximal and/or closer to the free distal edge of the stand panel, and can have a length substantially equal to the length of the stand panel, to provide support to the tablet. The stand panel 26 can have a cavity to receive the kickstand 38 when not deployed. The kickstand can extend a width of the stand panel to provide lateral support. In addition, the kickstand can extend around a majority of the sides and proximal edge of the back of the stand panel. The kickstand 38 can be pivotal between: 1) a retracted position against the stand panel, corresponding to the folded storage configuration; and 2) an extended position with a distal end of the kickstand disposed away from the stand panel, corresponding to the unfolded use configuration.

The shelf 42 is pivotally coupled to a front of the stand panel 26 at a shelf hinge or pivot 88. The shelf hinge is located proximate to the stand hinge 34. The shelf 42 is pivotal between: 1) a retracted position against the stand panel, corresponding to the folded storage configuration; and 2) an extended position with a distal end of the shelf disposed away from the stand panel, corresponding to the unfolded use configuration configured to receive the tablet computer thereon. In the extended position, the shelf can extend at a right or perpendicular angle with respect to the stand panel. In one aspect, a free distal end of the shelf can have a lip projecting therefrom to retain the tablet on the shelf. In another aspect, the shelf can have a hole or an aperture therein to receive the tablet therethrough. The shelf containing the hole or aperture can capture a lower end of the tablet when used in the portrait mode to resist or prevents the tablet from tipping backward when a center of mass is equal to or behind the kickstand contact area on the support surface. In another aspect, the shelf can carry an electromechanical socket or plug to physically and electrically coupled to a mating electromechanical plug or socket, respectively, of the tablet. The front of the stand panel can include a shelf pocket to receive the shelf in the retracted position, and to allow the stand panel to fold against the back or bottom of the proximal panel in the folded storage panel. In one aspect, the shelf can extend a width of the keyboard. Thus, the shelf can support an entire width or height (landscape mode) of the tablet.

The keyboard can comprise a sensor carried by the at least one of the pair of keyboard 18 and 22 or stand 26 panels for sensing when the pair of keyboard and stand panels are opened. In one aspect, the sensor can include a magnetic switch carried by one panel, and a magnet carried by another panel. In another aspect, the magnet can align with the switch when closed, rendering the switch inoperable, but disengage the switch when open, thus operating the switch. In another aspect, the magnet can align with the switch when open, thus operating the switch. The sensor can be operatively coupled to the communication means to automatically start the communication means. Thus, opening the keyboard can start the communication means to automatically communicate with the tablet so that the use can begin immediately.

A method for using the foldable keyboard described above, and for selectively carrying and operatively coupling to a tablet computer, comprises pivoting the stand panel 26 about the stand hinge 34 outwardly away from the keyboard panels 18 and 22, and to form an obtuse angle with respect to the keyboard panels; and pivoting the proximal keyboard panel 18 about the keyboard hinge 30 outwardly away from the distal keyboard panel 22 with the pair of keyboard panels oriented substantially parallel and substantially co-planar. The kickstand 38 is pivoted about the kickstand hinge 84 away from the stand panel to the extended position. The shelf 42 is pivoted about the shelf hinge 88 away from the stand panel to the extended position. The tablet computer 14 is placed on the shelf 42 and against the stand panel 26. The tablet computer 14 and the foldable keyboard 10 are caused to operatively couple to one another such that keystrokes on the keyboard register with the tablet computer. The tablet computer 14 is removed from the shelf 42. The shelf 42 is pivoted about the shelf hinge 88 towards the stand panel 26 to the retracted position. The kickstand 38 is pivoted about the kickstand hinge 84 towards the stand panel 26 to the retracted position. The proximal keyboard panel 18 is pivoted about the keyboard hinge 30 inwardly toward the distal keyboard panel 22 with the pair of keyboard panels oriented substantially parallel and with the keys of each of the pair of keyboard panels facing towards one another; and the stand panel 26 is pivoted about the stand hinge 34 inwardly towards the keyboard panels 18 and 22, and over the proximal keyboard panel 18 with the proximal keyboard panel 18 between the stand panel 26 and the distal keyboard panel 22.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A tri-panel and bi-fold foldable keyboard device having i) a folded storage configuration, and ii) an unfolded use configuration configured to selectively carry and operatively couple to a tablet computer, the device comprising:
   a) a pair of keyboard panels pivotally coupled together by a keyboard hinge, and having a proximal panel with a free proximal edge and a distal keyboard panel with a distal edge opposite the free proximal edge, both of the pair of keyboard panels having a plurality of keys defining an alphanumeric keyboard with the plurality of keys arranged in rows and the keyboard hinge disposed between two adjacent rows of the alphanumeric keyboard, and with a spacing between adjacent rows without the keyboard hinge being substantially the same as a spacing between the two adjacent rows with the keyboard hinge;
   b) the pair of keyboard panels folding between i) the unfolded use configuration with the pair of keyboard panels oriented substantially parallel and substantially co-planar, and with the keys of each of the pair of keyboard panels facing outwardly and exposed for use, and ii) the folded storage configuration in which the pair of keyboard panels are oriented substantially parallel and facing one another, and with the keys of each of the pair of keyboard panels facing towards one another; and
   c) a stand panel pivotally coupled to the distal edge of the distal keyboard panel at a stand hinge, and foldable between i) the unfolded use configuration in which the stand panel forms an obtuse angle with respect to the pair of keyboard panels configured to receive the tablet computer, and ii) the folded storage configuration in which the stand panel is folded over the proximal keyboard panel with the proximal keyboard panel between the stand panel and the distal keyboard panel.

2. The foldable keyboard device in accordance with claim 1, wherein the stand panel has a depth oriented in a fore and aft direction with respect to the keyboard that is substantially the same as a depth oriented in the fore and aft direction with respect to the keyboard of the distal keyboard panel.

3. The foldable keyboard device in accordance with claim 1, further comprising:
   a) a kickstand pivotally coupled to a back of the stand panel at a kickstand pivot located intermediate the stand hinge and a free edge of the stand panel; and
   b) the kickstand being pivotal between i) a retracted position against the stand panel, corresponding to the folded storage configuration, and ii) an extended position with a distal end of the kickstand disposed away from the stand panel, corresponding to the unfolded use configuration.

4. The foldable keyboard device in accordance with claim 1, further comprising:
   a) a shelf pivotally coupled to a front of the stand panel at a shelf pivot located proximate to the stand hinge; and
   b) the shelf being pivotal between i) a retracted position against the stand panel, corresponding to the folded storage configuration, and ii) an extended position with a distal end of the shelf disposed away from the stand panel, corresponding to the unfolded use configuration and configured to receive the tablet computer thereon.

5. The foldable keyboard device in accordance with claim 4, further comprising a shelf pocket in the front of the stand panel receiving the shelf in the retracted position.

6. The foldable keyboard device in accordance with claim 1, wherein the keyboard hinge further comprises:
   a double axle keyboard hinge with a proximal keyboard hinge and a distal keyboard hinge interconnected by a link.

7. The foldable keyboard device in accordance with claim 6, wherein the link is flush with a panel surface of the pair of keyboard panels.

8. The foldable keyboard device in accordance with claim 1, wherein the keyboard hinge further comprises:
   a) a plurality of separate and discrete hinges arrayed along a width, oriented in a lateral direction with respect to the keyboard, of the pair of keyboard panels; and
   b) all of the plurality of hinges are located interior with respect to exterior lateral sides of the pair of keyboard panels.

9. The foldable keyboard device in accordance with claim 8, wherein outermost hinges are separated from the exterior lateral sides of the pair of keyboard panels by at least one key.

10. The foldable keyboard device in accordance with claim 1, wherein the keyboard hinge is located below a top surface of the keys in the unfolded use configuration.

11. The foldable keyboard device in accordance with claim 1, further comprising:
   a) a power source carried by the stand panel; and
   b) communication means for communicating with the tablet computer carried by the stand panel.

12. The foldable keyboard device in accordance with claim 11, further comprising:
   a sensor carried by the at least one of the pair of keyboard or stand panels for sensing when the pair of keyboard and stand panels are opened, and operatively coupled to the communication means to automatically start the communication means.

13. The foldable keyboard device in accordance with claim 1, wherein the pair of keyboard and stand panels in the folded storage configuration have a combined thickness less than 15 mm; and wherein the pair of keyboard and stand panels in the folded storage configuration have a depth oriented in a fore and aft direction with respect to the keyboard less than 60 mm.

14. A foldable keyboard device having i) a folded storage configuration, and ii) an unfolded use configuration configured to selectively carry and operatively couple to a tablet computer, the device comprising:
   a) a pair of keyboard panels pivotally coupled together by a keyboard hinge, and having a proximal panel with a free proximal edge and a distal keyboard panel with an opposite edge opposite the free proximal edge, both of the pair of keyboard panels having a plurality of keys defining an alphanumeric keyboard with the plurality of keys arranged in rows and the keyboard hinge disposed between two adjacent rows of the alphanumeric keyboard, and with a spacing between adjacent rows without the keyboard hinge being substantially the same as a spacing between the two adjacent rows with the keyboard hinge;
   b) the pair of keyboard panels folding between i) the unfolded use configuration with the pair of keyboard panels oriented substantially parallel and substantially co-planar, and with the keys of each of the pair of keyboard panels facing outwardly and exposed for use, and ii) the folded storage configuration in which the pair of keyboard panels are oriented substantially parallel and facing one another, and with the keys of each of the pair of keyboard panels facing towards one another; and
   c) a stand panel pivotally coupled to the opposite edge of the distal keyboard panel at a stand hinge, and foldable between i) the unfolded use configuration in which the stand panel forms an obtuse angle with respect to the pair of keyboard panels configured to receive the tablet computer, and ii) the folded storage configuration in which the stand panel is folded over the proximal keyboard panel with the proximal keyboard panel between the stand panel and the distal keyboard panel;
   d) a kickstand pivotally coupled to a back of the stand panel at a kickstand pivot located intermediate the stand hinge and a free edge of the stand panel;
   e) the kickstand being pivotal between i) a retracted position against the stand panel, corresponding to the folded storage configuration, and ii) an extended position with a distal end of the kickstand disposed away from the stand panel, corresponding to the unfolded use configuration;
   f) a shelf pivotally coupled to a front of the stand panel at a shelf pivot located proximate to the stand hinge; and
   g) the shelf being pivotal between i) a retracted position against the stand panel, corresponding to the folded storage configuration, and ii) an extended position with a distal end of the shelf disposed away from the stand panel, corresponding to the unfolded use configuration configured to receive the tablet computer thereon.

15. The foldable keyboard device in accordance with claim 14, wherein the keyboard hinge further comprises:
   a double axle keyboard hinge with a proximal keyboard hinge and a distal keyboard hinge interconnected by a link.

16. The foldable keyboard device in accordance with claim 14, further comprising:
   a) a power source carried by the stand panel; and
   b) communication means for communicating with the tablet computer carried by the stand panel.

17. The foldable keyboard device in accordance with claim 16, further comprising:
   a sensor carried by the at least one of the pair of keyboard or stand panels for sensing when the pair of keyboard and stand panels are opened, and operatively coupled to the communication means to automatically start the communication means.

18. A method for using the foldable keyboard device in accordance with claim 14 with the tablet computer, the method comprising:
   a) pivoting the stand panel about the stand hinge outwardly away from the keyboard panels and to form an obtuse angle with respect to the keyboard panels, and pivoting the proximal keyboard panel about the keyboard hinge outwardly away from the distal keyboard panel with the pair of keyboard panels oriented substantially parallel and substantially co-planar;
   b) pivoting the kickstand about the kickstand hinge away from the stand panel to the extended position;
   c) pivoting the shelf about the shelf hinge away from the stand panel to the extended position;
   d) placing the tablet computer on the shelf and against the stand panel;
   e) causing the tablet computer and the foldable keyboard device to operatively couple to one another such that keystrokes on the keyboard register with the tablet computer;
   f) removing the tablet computer from the shelf;
   g) pivoting the shelf about the shelf hinge towards the stand panel to the retracted position;
   h) pivoting the kickstand about the kickstand hinge towards the stand panel to the retracted position; and
   i) pivoting the proximal keyboard panel about the keyboard hinge inwardly toward the distal keyboard panel with the pair of keyboard panels oriented substantially parallel and with the keys of each of the pair of keyboard panels facing towards one another, and pivoting the stand panel about the stand hinge inwardly towards the keyboard panels and over the proximal keyboard panel with the proximal keyboard panel between the stand panel and the distal keyboard panel.

19. A tri-panel and bi-fold foldable keyboard device having i) a folded storage configuration, and ii) an unfolded use configuration configured to selectively carry and operatively couple to a tablet computer, the device comprising:

a) a pair of keyboard panels pivotally coupled together by a keyboard hinge, and having a proximal panel with a free proximal edge and a distal keyboard panel with an opposite edge opposite the free proximal edge, both of the pair of keyboard panels having a plurality of keys with the plurality of keys of both of the pair of keyboards panel together defining an alphanumeric keyboard with the plurality of keys arranged in rows and the keyboard hinge disposed laterally between a linear partition between two adjacent rows of the alphanumeric keyboard and bifurcating the alphanumeric keyboard, and with a spacing between adjacent rows without the keyboard hinge being substantially the same as a spacing between the two adjacent rows with the keyboard hinge;

b) the keyboard hinge further comprising a double axle keyboard hinge with a proximal keyboard hinge and a distal keyboard hinge interconnected by a link, and a spacing between adjacent rows without a hinge being substantially the same as a spacing between the two adjacent rows with the double axle keyboard hinge;

c) the pair of keyboard panels folding between i) the unfolded use configuration with the pair of keyboard panels oriented substantially parallel and substantially co-planar, and with the keys of each of the pair of keyboard panels facing outwardly and exposed for use, and ii) the folded storage configuration in which the pair of keyboard panels are oriented substantially parallel and facing one another, and with the keys of each of the pair of keyboard panels facing towards one another;

d) a stand panel pivotally coupled to the opposite edge of the distal keyboard panel at a stand hinge, and foldable between i) the unfolded use configuration in which the stand panel forms an obtuse angle with respect to the pair of keyboard panels, configured to receive the tablet computer, and ii) the folded storage configuration in which the stand panel is folded over the proximal keyboard panel with the proximal keyboard panel between the stand panel and the distal keyboard panel;

e) a kickstand pivotally coupled to a back of the stand panel at a kickstand hinge located intermediate the stand hinge and a free edge of the stand panel;

f) the kickstand being pivotal between i) a retracted position against the stand panel, corresponding to the folded storage configuration, and ii) an extended position with a distal end of the kickstand disposed away from the stand panel, corresponding to the unfolded use configuration;

g) a shelf pivotally coupled to a front of the stand panel at a shelf hinge located proximate to the stand hinge;

h) the shelf pivotal between i) a retracted position against the stand panel, corresponding to the folded storage configuration, and ii) an extended position with a distal end of the shelf disposed away from the stand panel, corresponding to the unfolded use configuration configured to receive the tablet computer thereon;

i) a power source carried by the stand panel;

j) communication means for communicating with the tablet computer carried by the stand panel; and k) a sensor carried by the at least one of the pair of keyboard or stand panels for sensing when the pair of keyboard and stand panels are opened, and operatively coupled to the communication means to automatically start the communication means.

20. A foldable keyboard device configured to selectively carry and operatively couple to a tablet computer, the device comprising:

a) a pair of keyboard panels pivotally coupled together by a keyboard hinge, and having a proximal panel and a distal panel, both of the pair of keyboard panels having a plurality of keys defining an alphanumeric keyboard with the plurality of keys arranged in rows, and the pair of keyboard panels having an unfolded use configuration with the pair of keyboard panels oriented substantially parallel and substantially co-planar;

b) the keyboard hinge being oriented laterally with respect to the keyboard and located and extending between two adjacent rows of the alphanumeric keyboard;

c) a spacing between adjacent rows without the keyboard hinge being substantially the same as a spacing between the two adjacent rows with the keyboard hinge;

d) the proximal panel being foldable over the distal panel with the keys thereof opposing one another in a folded storage configuration;

e) a stand panel being pivotally coupled to the distal panel at a stand hinge;

f) the stand hinge being oriented laterally with respect to the keyboard;

g) the stand panel being pivotal over the proximal panel of the keyboard in the folded storage configuration;

h) a kickstand being pivotally coupled to a back of the stand panel; and i) a shelf pivotally coupled to a front of the stand panel at a shelf hinge located proximate to the stand hinge, and the shelf being pivotal between i) a retracted position against the stand panel, corresponding to the folded storage configuration, and ii) an extended position with a distal end of the shelf disposed away from the stand panel, corresponding to the unfolded use configuration and configured to receive the tablet computer thereon.

21. The foldable keyboard device in accordance with claim 20, wherein the keyboard hinge further comprises:

a double axle keyboard hinge with a proximal keyboard hinge and a distal keyboard hinge interconnected by a link.

\* \* \* \* \*